United States Patent [19]
Harris

[11] Patent Number: 5,742,463
[45] Date of Patent: Apr. 21, 1998

[54] PROTECTION DEVICE USING FIELD EFFECT TRANSISTORS

[75] Inventor: Richard Allen Harris, Kawana Downs, Australia

[73] Assignee: The University of Queensland, Australia

[21] Appl. No.: 912,620

[22] Filed: Aug. 18, 1997

Related U.S. Application Data

[63] Continuation of Ser. No. 578,676, PCT/AU94/00358 Jun. 29, 1994, abandoned.

[30]     Foreign Application Priority Data

Jul. 1, 1993 [AU] Australia ................................ PL9711

[51] Int. Cl.⁶ .................................................. H02H 3/14
[52] U.S. Cl. ............................ 361/88; 361/58; 361/111
[58] Field of Search ............................ 361/18, 54, 56–58, 361/91, 111, 88; 323/276, 908, 911

[56]     References Cited
U.S. PATENT DOCUMENTS

| | | | |
|---|---|---|---|
| 4,533,970 | 8/1985 | Brown | 361/58 |
| 4,744,369 | 5/1988 | Kroll | 361/58 |
| 4,868,703 | 9/1989 | Borkowicz | 361/58 |
| 5,196,980 | 3/1993 | Carson | 361/56 |

FOREIGN PATENT DOCUMENTS

| | | |
|---|---|---|
| A- 75035/91 | 11/1991 | Australia . |
| A 4022253 | 1/1991 | Germany . |
| A 3-48456 | 3/1991 | Japan . |
| A 3-53613 | 3/1991 | Japan . |
| A 3-65020 | 3/1991 | Japan . |
| A 3-145918 | 6/1991 | Japan . |
| 1 498 527 | 1/1978 | United Kingdom ............ H02H 3/00 |

*Primary Examiner*—Ronald W. Leja
*Attorney, Agent, or Firm*—Nixon & Vanderhye P.C.

[57]     ABSTRACT

A device which may protect circuits or equipment from overload or transients is disclosed. The device includes a unit consisting of a p-channel FET and an n-channel FET connected with their conductive channels in series and the gate of each transistor coupled to the drain terminal of the other.

17 Claims, 4 Drawing Sheets

5,742,463

PROTECTION DEVICE USING FIELD EFFECT TRANSISTORS

This is a continuation of application Ser. No. 08/578,676, filed as PCT/AU94/00358 Jun. 29, 1994, now abandoned.

FIELD OF THE INVENTION

This invention concerns a protection device. In particular, the invention concerns a protection device which may function to prevent the flow of undesirable transients or isolate a load from undesirably high voltages or currents.

1. Background of the Invention

The device of the invention may be used as an alternative to a fuse. Fuses employing thermal elements or magnetic elements for effecting control are known.

It is an object of the present invention to provide an active fuse which may serve as an alternative to these known types of fuses or for inhibiting the flow of transients.

2. Disclosure of the Invention

According to one aspect, the invention provides a protection device connectable between a supply and a load or in a circuit, the device including a unit having at least two depletion mode field effect transistors (FET) with one being an n-channel FET and the other a p-channel FET with the gate terminal of one transistor connected to the drain terminal of the other transistor and the source terminals connected to each other.

While any suitable depletion mode transistors such as depletion mode junction field effect transistors (JFET), static induction JFET or depletion mode metal oxide semiconductor field effect transistors (MOSFET) may be used to provide the device of the invention, it is preferred that JFET transistors be employed.

The device of the invention may be either unipolar or bipolar in its operation. Where unipolar operation is required the device has only one unit of the type described above. Depending upon the direction of current flow in the circuit with which the device is associated either the p-channel or the n-channel JFET transistor is nearer the supply than the other JFET transistor and with its drain terminal coupled to the supply.

For bipolar operation it is preferred that two units of the type described may be present connected to each other in mirror symmetry in series with the load with the p-channel JFET transistors separated by two n-channel JFET transistors. With such a configuration, one of the n-channel JFET transistors may be eliminated and by employing a respective polling diode extending between the gate terminal of the n-channel JFET transistor and the drain terminal of each p-channel JFET transistor. In this way the JFET count may be minimized. The diodes connect the n-channel JFET gate appropriately for forward and reverse current polarities. The conductive state resistance of the device is reduced by eliminating one of the JFETs in this way. As an alternative to employing two units of the abovementioned type to provide a bipolar protection device, a single unit may be employed and incorporated into a bridge rectifier circuit.

If desired, additional n-channel JFET transistors may be connected with their drain/source path in series with the n-channel and between the two p-channel JFET transistors to achieve a higher breakdown performance. Each additional JFET transistor has two polling diodes associated with it.

DISCLOSURE OF THE DRAWINGS

Particular preferred embodiments of the invention will now be described by way of example with reference to the drawings in which.

DETAILED DESCRIPTION OF THE DRAWINGS

Figure 1:
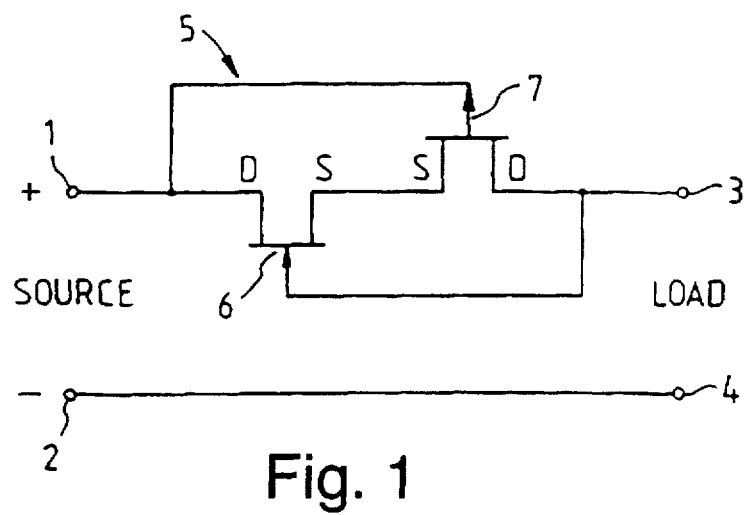
FIG. 1 is a circuit diagram illustrative of a protection device in its most basic form in accordance with an embodiment of the invention.

As shown in FIG. 1, a source or supply voltage is connected across terminals 1 and 2 with the polarity shown. A load (not shown) is coupled across terminals 3 and 4 of the circuit. The active components of the device are present as a unit 5 connected in series with the load. The unit 5 consists of two depletion mode junction field effect transistors (JFETs) 6 and 7. JFET 6 is an n-channel device while JFET 7 is a p-channel device. The JFETs 6 and 7 are connected, the source terminals coupled to each other, and the drain terminal of JFET 6 is coupled to the gate terminal of JFET 7 and the drain terminal of JFET 7 is coupled to the gate terminal of JFET 6. Although JFET transistors are shown in this circuit, any depletion mode field effect transistor may be used. For example, the JFET transistors illustrated may be replaced with depletion mode MOSFET transistors.

The operation of the circuit shown in FIG. 1 is as follows. With a supply voltage connected across terminals 1 and 2 with the polarity shown, the protection device of FIG. 1 is a unipolar device and can operate as a fuse only for the flow of positive current from terminal 1 through to terminal 3 or to inhibit the flow of transients from terminal 1 to terminal 3. Because of the small junction resistance of JFET transistors 6 and 7, a small potential drop is developed across terminals 1 and 3 with the bulk of the potential drop occurring across the load connected between terminals 3 and 4. The voltage drop across JFET 7 tends to turn off JFET 6 and the small voltage drop across JFET 6 tends to turn off JFET 7. Until a threshold voltage is reached, both JFETs 6 and 7 function as small resistors. Depending upon the pinch off voltage characteristics of the JFET transistors employed, the condition described holds until the potential across the channels reaches a predetermined magnitude and at a threshold current this action avalanches to a stable point where both JFET transistors are firmly in the cut-off phase and as a consequence the unit 5 will then isolate the load from the supply voltage. Removal of the driving potential which provided the threshold current resets the device to its pre-triggered fully conducting state.

The device of FIG. 1 described above functions as a fuse for positive current flowing from terminal 1 through to terminal 3.

Figure 2:
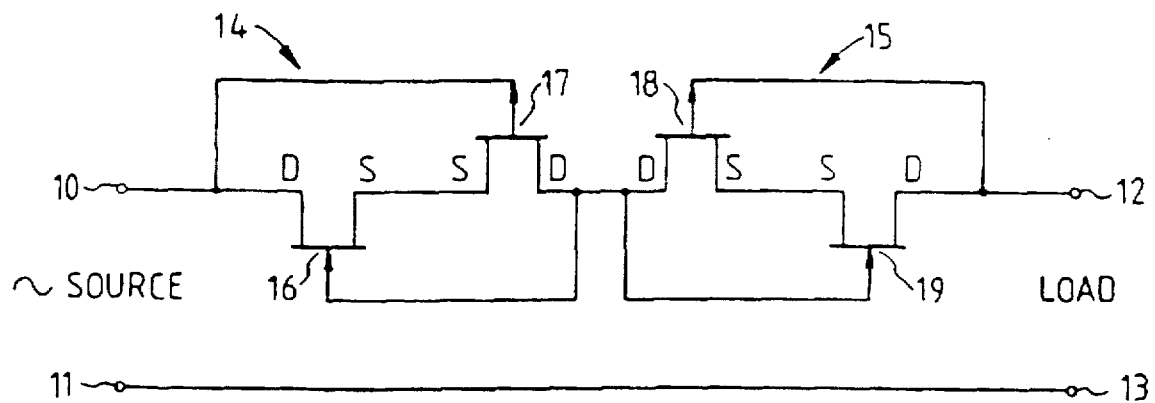
FIG. 2 is a circuit diagram of a bipolar protection device in accordance with another embodiment of the invention.

FIG. 2 of the drawings illustrates a device which is bipolar in its operation. The active fuse of FIG. 2 has a bipolar supply voltage applied across terminals 10 and 11 and the load (not shown) is coupled across terminals 12 and 13. Units 14 and 15 provide for isolation of the load from the supply in response to excessive positive and negative excursions respectively. Unit 14 is identical in its construction to unit 5 of FIG. 1. Unit 14 has an n-channel JFET transistor 16 and a p-channel JFET transistor 17 connected with the source terminals coupled to each other and the gate of each transistor connected to the drain terminal of the other transistor. Unit 14 is similar in operation to unit 5 of FIG. 1 in that it is operative to limit positive excursions. Unit 15 consists of a p-channel JFET transistor 18 and an n-channel JFET transistor 19 with the gate of each transistor connected to the drain of the other and their source terminals connected together. Unit 15 operates in a similar manner to unit 14 except that it is responsive to limit negative going excursions of current from the source or supply to the load. Although in FIG. 2 unit 14 is shown connected in series with the load and closer to supply terminal 10, the circuit would function in the same fashion with the relative positions of units 14 and 15 transposed, that is with unit 15 in series with the load and closer to terminal 10 than unit 14.

Figure 3:
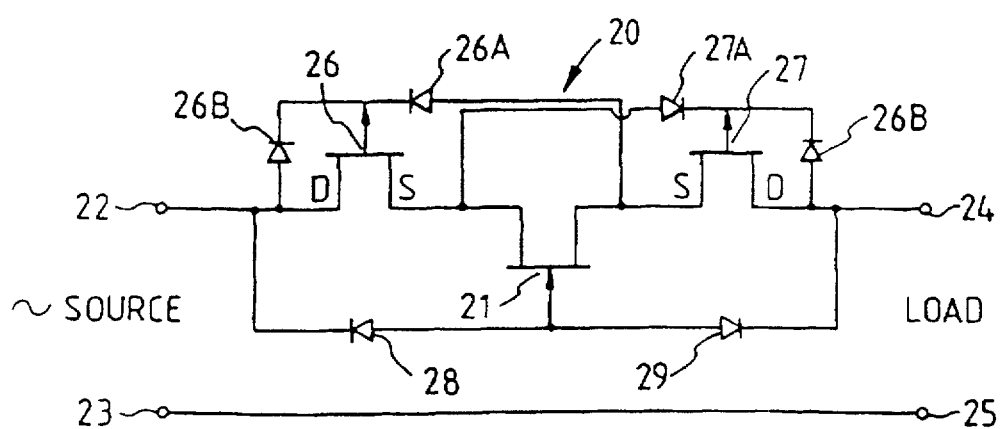
FIG. 3 is a circuit diagram of a bipolar protection device similar in operation to the device of FIG. 2 except that the number of active components has been minimised.

The device illustrated in FIG. 3 is arrived at by minimizing the number of active JFET transistors employed in the bipolar protection device of FIG. 2. With the units 14 and 15 of FIG. 2 transposed in the manner described above, n-channel JFET transistors 16 and 19 would be adjacent to one another and as a consequence one of these JFET transistors may be eliminated. This is how the configuration of FIG. 3 is arrived at. The unit 20 in FIG. 3 includes a centrally located n-channel JFET transistor 21. A supply potential or source is coupled between terminals 22 and 23 and a load (not shown) is coupled across terminals 24, 25. The unit 20 also includes two p-channel JFET transistors 26 and 27 as well as two diodes 28 and 29. JFET transistor 26 has its gate terminal coupled to the source terminal of JFET transistor 27 and its drain terminal coupled to terminal 22. The drain terminal of JFET transistor 27 is coupled to load terminal 24 while the gate terminal of that transistor is coupled to the source terminal of JFET transistor 26. Diodes 28 and 29 provide for the desired poling of JFET transistor 21.

The device of FIG. 3 operates as follows. With positive current flowing from terminal 22 to terminal 24, diodes 28, 29, 26A, 26B, 27A switch to effectively connect the gate of transistor 21 to the drain of transistor 27, the gate of transistor 27 to the source of transistor 26 and the drain terminal of FET 26 to the gate terminal of FET 26. This results in a circuit with the same electrical-performance of Unit 14 (FIG. 2). With negative current flowing from terminal 22 to terminal 24, diodes 28, 29, 26A, 26B, 27A switch to effectively connect the gate of transistor 21 to the drain of transistor 26, the gate of transistor 26 to the source of transistor 27 and the drain terminal of FET 27 to the gate terminal of FET 27. This results in a circuit of the same electrical performance as Unit 15 (FIG. 2). Diodes 26B extend between the drain and gate terminals of transistors 26 and 27 and ensure that positive current is able to flow from the drain to the gate of each transistor 26, 27. This allows the device to reset after a current reversal. Diodes 26B are commutation diodes.

Figure 7:
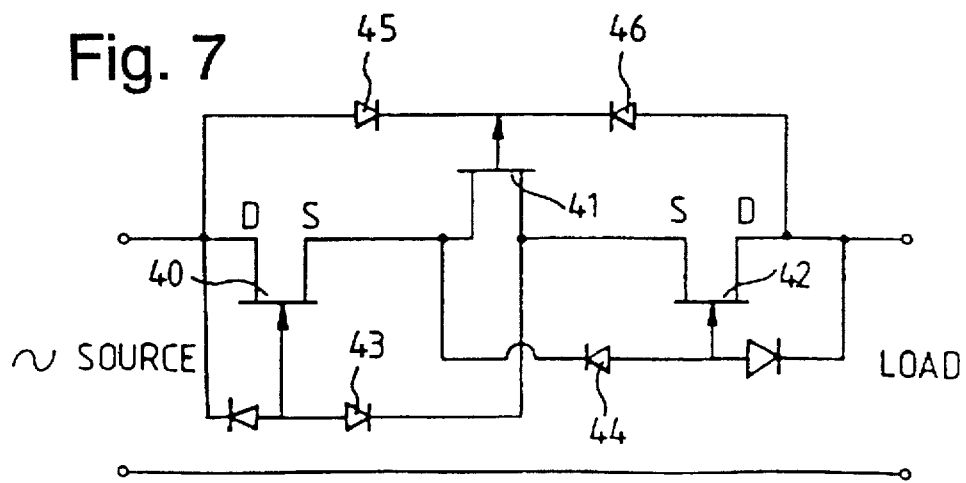
FIG. 7 is a further embodiment of the device according to the invention adapted for unipolar operation and similar in configuration to the embodiment shown in FIG. 3.

The embodiment of FIG. 2 may also be minimized by eliminating one of the p-channel JFETs and thereby arriving at the device shown in FIG. 7. In FIG. 7 the conductive channels of all three JFETs 40, 41, 42 are in series. JFETs 40, 42 are n-channel JFETS while JFET 41 is a p-channel JFET. Diodes 43, 4 and 45, 46 are necessary for proper biasing and pulling of the transistors.

The device of FIG. 3 has a limitation in that commercially available depletion mode JFET transistors have a relatively low breakdown strength. This characteristic limits the basic implementation of the device of FIG. 3 to low voltage blocking operations.

Figure 4:
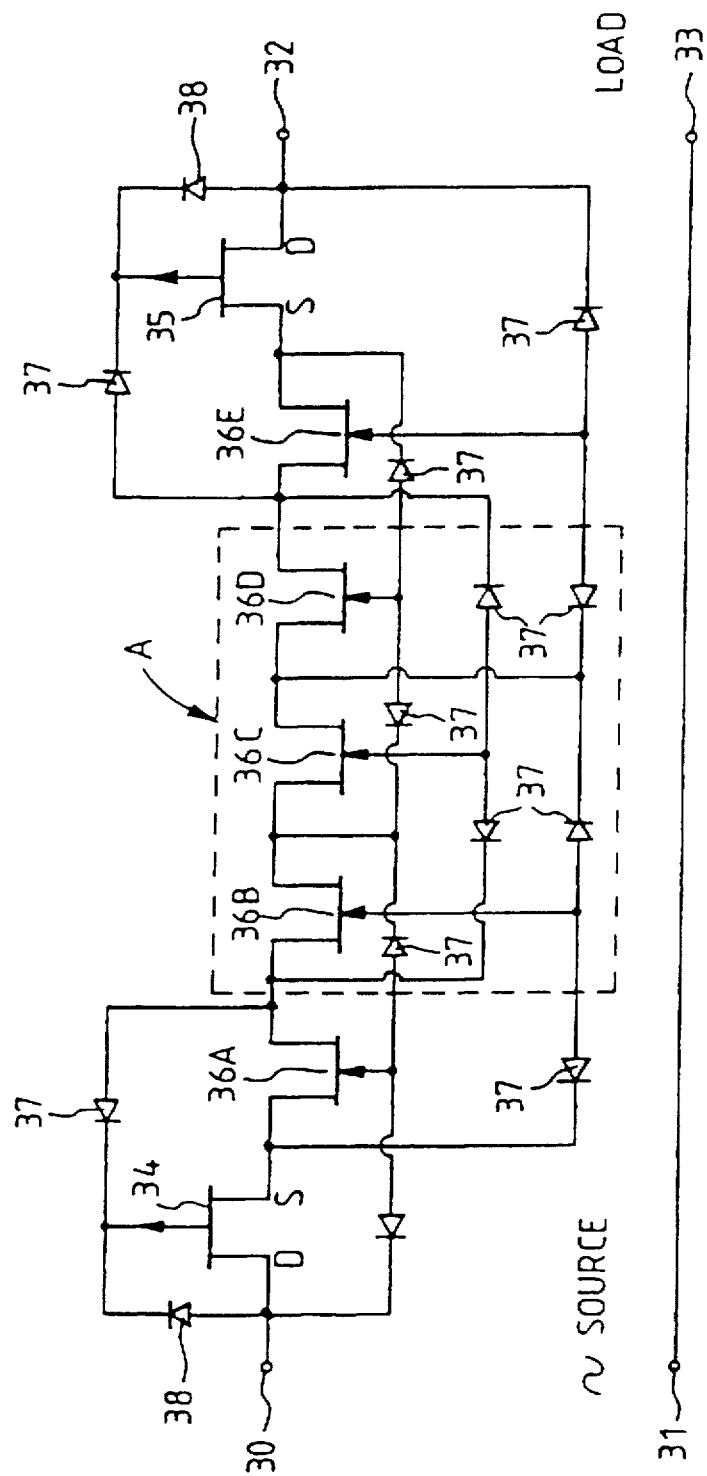
FIG. 4 is a circuit diagram of a bipolar protection device having higher breakdown performance than the device illustrated in FIG. 3.

The protection device of FIG. 4 overcomes the low breakdown strength limitation of the device of FIG. 3. In FIG. 4 a supply or source potential is applied across terminals 30 and 31 and a load is coupled across terminals 32 and 33. A p-channel JFET transistor 34 is coupled with its drain terminal connected to terminal 30. P-channel JFET transistor 35 is coupled with its drain terminal connected to terminal 32. A plurality of n-channel JFET transistors 36A, 36B, 36C, 36D, 36E may be arranged in a ladder network as shown. N-channel JFET transistors 36 function in a like manner to JFET 21 of FIG. 3. A diode network consisting of diodes 37 is provided to ensure that the gate terminals of n-channel FET transistors 36A to 36E are appropriately biased for both positive and negative current operation. A commutation diode 38 is associated with each transistor 34, 35 and function in a like fashion to diodes 26B in FIG. 3. The components within the broken outline A may be considered as a block and if higher breakdown protection is required further like blocks may be included in series with the JFETS 36A and 36E to achieve this. If the block A is depleted the circuit remaining resembles the circuit of FIG. 2 except that additional diodes are present.

Figure 5:
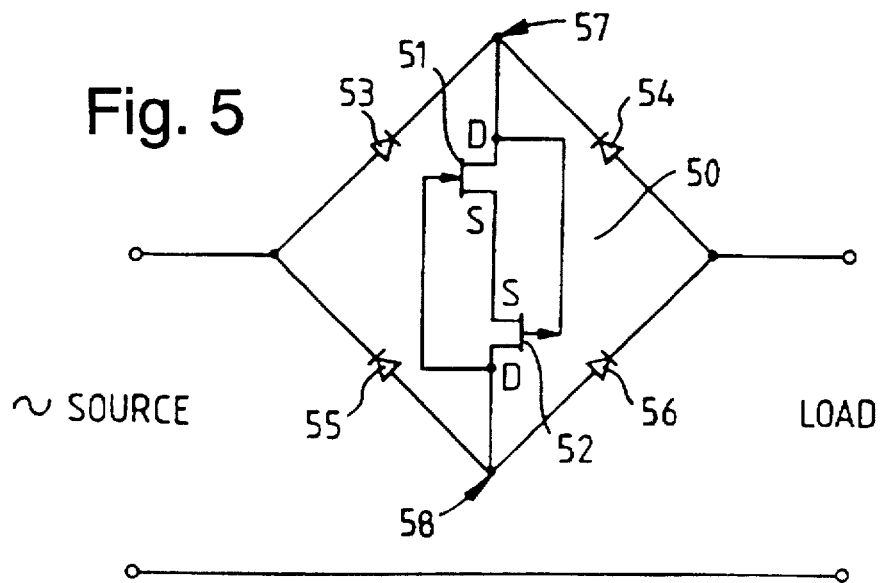
FIG. 5 is an alternative embodiment of the device of the invention adapted for bipolar operation.

FIG. 5 shows a circuit diagram of another way in which the basic unit 5 in FIG. 1 may be used to provide a bipolar protection device in accordance with the invention. In FIG. 5 unit 50 consists of JFETs 51, 52 which are n and p-channel JFETs respectively. The unit functions in exactly the same manner as unit 5 in FIG. 1. Diode bridge, consisting of diodes 53, 54, 55, 56 is connected in series with the source and load. Unit 50 is connected between the junctions 57, 58 and the diodes ensure that positive current always flows through unit 50 in the same direction. When unit 50 is conducting current may flow between the source and load. When unit 50 is non-conducting, no flow of current is possible.

A device like that shown in FIG. 5 would only be used where the source voltage was greater than the junction voltage drop of two of the diodes in the circuit.

Figure 6:
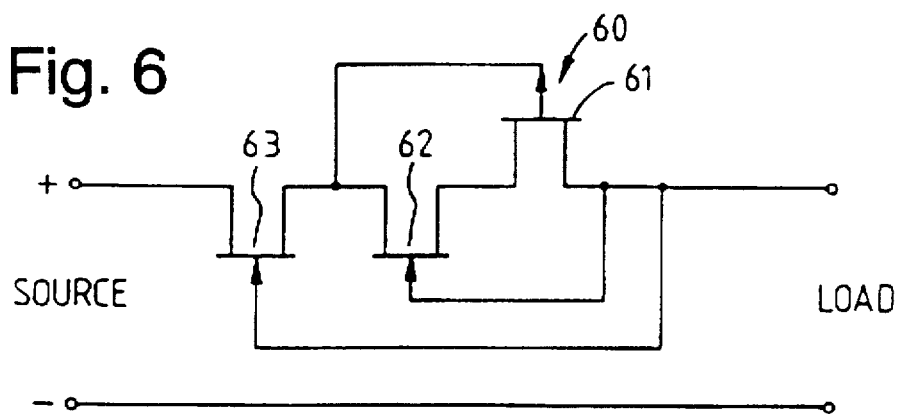
FIG. 6 is a further embodiment of the device of the invention adapted for unipolar operation.

FIG. 6 shows a device including a unit 60 identical to the unit 5 in FIG. 1. Unit 60 includes a p-channel JFET 61 with its conductive channel in series with the conductive channel, of n-channel JFET 62 connected as shown. JFET 63 is an n-channel JFET of high breakdown voltage and such JFETs are typically more expensive than low breakdown voltage JFETs 61, 62. Although JFETs 61 and 62 may be replaced with a unitary p-channel JFET having the same breakdown voltage characteristics as JFET 68 and those two JFETS configured as a unit, the circuit shown in FIG. 6 is more economical. The FIG. 6 circuit is unipolar. If desired the unit 60 and the series connected JFET 63 may be used in the circuit of FIG. 5 in place of unit 50 to provide a high voltage protection device.

Figure 8:
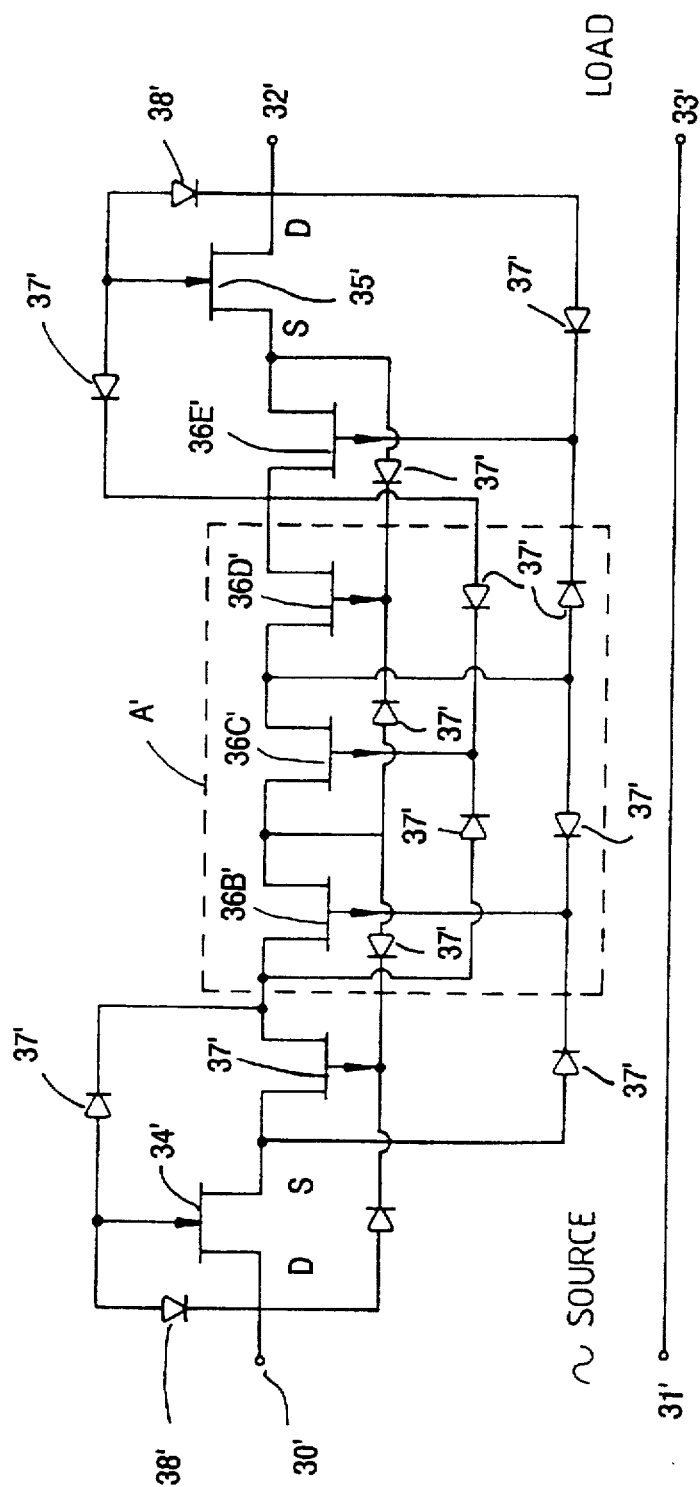
FIG. 8 is a circuit diagram of a bipolar protection device having higher breakdown performance than the device illustrated in FIG. 3, and of similar configuration of the embodiment in FIG. 4.

In much the same way as the FIG. 3 embodiment of the invention may be implemented as shown in FIG. 7, the embodiment of FIG. 4 may also be implemented in an alternative way. This alternative implementation is shown in FIG. 8. FIG. 8 utilizes similar notation to identify the various components of the circuit except that the numerals and lettering are distinguished by the addition of a prime.

I claim:

1. An isolation device connectable between a supply and a load or in a circuit, the device including a first p-channel FET, a second p-channel FET, and an n-channel FET having its conductive channel between and in series with the conductive channels of the p-channel FETs, a respective diode connected between the gate terminal of the n-channel FET and each said p-channel FET with the anode of the diodes coupled to the gate of the n-channel FET and the cathode connected to the drain of each said p-channel FET, a respective diode connected between the source of the second p-channel FET and the gate of the first p-channel FET and between the source of the first p-channel FET and the gate of the second p-channel FET wherein the FETs are depletion mode FETs whereby the device is operative to present an effective open circuit when a threshold voltage of at least a predetermined magnitude is developed across the conductive channels of the FETs.

2. The device of claim 1 wherein the diodes are directly connected.

3. The device of claim 2 including a respective diode directly coupled between the drain and gate terminals of each of the p-channel FETs.

4. An isolation device connectable between a supply and a load or in a circuit, the device including a first n-channel FET, a second n-channel FET and a p-channel FET having its conductive channel between and in series with the conductive channels of the n-channel FETs, a respective diode connected between the gate terminal of the p-channel FET and each said n-channel FET with the cathode of the diodes coupled to the gate of the p-channel FET and the anode coupled to the drain terminal of each said N-channel FET, a respective diode connected between the source of the second n-channel FET and the gate of the first n-channel FET and between the source of the first n-channel FET and the gate of the second n-channel FET and wherein the FETs are depletion mode FETs.

5. The device of claim 4 wherein the diodes are directly connected.

6. The device of claim 4 including a respective diode directly coupled between the drain and gate terminals of each of the n-channel FETs.

7. An isolation device connectable between a supply and a load or in a circuit, the device including an upstream unit consisting of a p-channel FET and an n-channel FET downstream thereof with their conductive channels in series, the gate terminal of the p-channel FET being connected to the drain terminal of the n-channel FET and the source terminals of the FETs being connected to each other, a downstream unit configured like the upstream unit but in mirror symmetry and having a p-channel FET and an n-channel FET with their conductive channels in series with the p-channel FET of the downstream unit being connectable to the load, and at least one circuit block for enhancing breakdown performance of the device arranged between and in series with the upstream unit and the downstream unit whereby the device is operative to present an effective open circuit when a threshold voltage of at least a predetermined magnitude is developed across the conductive channels of the FETs.

8. The device of claim 7 wherein the circuit block includes three p-channel FET transistors with their conductive channels in series, a respective commutating diode connected between the gate terminal of each said n-channel FET of the circuit block and an adjacent said n-channel FET of the circuit block and two of the FETS of the circuit block having their gate terminal connected to an adjacent FET of the upstream and the downstream unit.

9. The device of claim 8 wherein the gate of the p-channel FET in each of the upstream and the downstream units is connected to the drain terminal of the n-channel FET in the respective said upstream and said downstream unit via a diode.

10. The device of claim 9 including a respective diode connected between the gate and drain terminals of each said p-channel FET of the upstream and the downstream units.

11. The device of claim 9 wherein all of said diodes are directly connected.

12. An isolation device connectable between a supply and a load or in a circuit, the device including an upstream unit consisting of an n-channel FET and a p-channel FET downstream thereof with their conductive channels in series, the gate terminal of the n-channel FET being connected to the drain terminal of the p-channel FET and the source terminals of the FETs being connected to each other, a downstream unit configured like the upstream unit but in mirror symmetry and having an n-channel FET and a p-channel FET with their conductive channels in series with the n-channel FET of the downstream unit being connectable to the load, and at least one circuit block for enhancing breakdown performance of the device arranged between and in series with the upstream and downstream units and wherein the FETs are depletion mode FETs whereby the device is operative to present an effective open circuit when a threshold voltage of at least a predetermined magnitude is developed across the conductive channels of the FETs.

13. The device of claim 12 wherein the circuit block includes three p-channel FETs with their conductive channels in series, a respective commutating diode connected between the gate terminal of each FET of the circuit block and an adjacent said FET of the block and two of the FETs of the circuit block having their gate terminal connected to an adjacent FET of the upstream and the downstream unit.

14. The device of claim 13 including a respective diode connected between the gate and drain terminals of each said n-channel FET of the upstream and the downstream units.

15. The device of claim 14 wherein said FETs are JFETs.

16. The device of claim 14 wherein said FETs are MOSFETs.

17. The device of claim 14 wherein said FETs are static induction FETs.

* * * * *